(12) United States Patent  
Zhuang et al.

(10) Patent No.: US 9,398,203 B2  
(45) Date of Patent: Jul. 19, 2016

(54) APPARATUS AND METHOD TO REDUCE PTZ LATENCY

(71) Applicant: Honeywell International Inc., Morristown, NJ (US)

(72) Inventors: Hanwei Zhuang, Shanghai (CN); Jie Chen, Shanghai (CN); Hanjin Zhou, Shanghai (CN); Zhenghong Huang, Shanghai (CN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 68 days.

(21) Appl. No.: 13/938,873

(22) Filed: Jul. 10, 2013

(65) Prior Publication Data

US 2015/0015731 A1 Jan. 15, 2015

(51) Int. Cl.
```
H04N 7/18      (2006.01)
H04N 5/232     (2006.01)
G08B 13/196    (2006.01)
```
(52) U.S. Cl.
CPC ....... *H04N 5/23206* (2013.01); *H04N 5/23216* (2013.01); *H04N 5/23296* (2013.01); *G08B 13/19689* (2013.01); *H04N 7/18* (2013.01)

(58) Field of Classification Search
None
See application file for complete search history.

(56) References Cited

U.S. PATENT DOCUMENTS

| | | | |
|---|---|---|---|
| 5,463,432 A | 10/1995 | Kahn | |
| 6,867,798 B1 | 3/2005 | Wada et al. | |
| 2005/0057361 A1* | 3/2005 | Giraldo et al. | 340/573.1 |
| 2006/0070111 A1* | 3/2006 | Kurosawa | H04N 7/17318 725/105 |
| 2006/0136972 A1 | 6/2006 | Metzger et al. | |
| 2009/0074184 A1* | 3/2009 | Baum et al. | 380/205 |
| 2010/0007744 A1* | 1/2010 | Oosawa | 348/207.1 |
| 2013/0155182 A1 | 6/2013 | Bekiares et al. | |

OTHER PUBLICATIONS

Axis Communications—AXIS Q60351-E PTZ Dome Network Cameras—HDTV 1080p PTZ domes with 20x zoom for the ultimate video quality.
Honeywell—HDZ Series—H.264 IP PTZ Dome—User Manual—Document 800-11644—Rev A— Jan. 2013.
ONVIF Core Specification—Version 2.2.1—Dec. 2012.
ONVIF PTZ Service Specification—Version 2.2.1—Dec. 2012.
Extended European search report and European search opinion for corresponding EP application 14173754.4, dated Oct. 27, 2014.

* cited by examiner

*Primary Examiner* — Aung S Moe  
*Assistant Examiner* — Euel Cowan  
(74) *Attorney, Agent, or Firm* — Husch Blackwell LLP

(57) ABSTRACT

An apparatus, system, and method to reduce PTZ latency are provided. The system can include an input port and a motor driver unit, and the input port can receive a PTZ request. The input port can transmit the PTZ request to the motor driver unit, and the motor driver unit can extract a PTZ command from the PTZ request. In some embodiments, the PTZ request can obviate transmission through a parser and a processor.

20 Claims, 2 Drawing Sheets

APPARATUS AND METHOD TO REDUCE PTZ LATENCY

FIELD

The present invention relates generally to IP PTZ cameras. More particularly, the present invention relates to an apparatus and method to reduce PTZ latency.

BACKGROUND

Known PTZ cameras and other video capture devices use a complex communication protocol to facilitate the pan, tilt, and zoom functions of the camera. This can be inefficient. Indeed, when a joystick, keyboard or other input device is used to control the pan, tilt, and zoom functions of the camera, the camera often does not pan, tilt, and/or zoom in a smooth manner and does not respond to the input control in as timely of a manner as is desired. Accordingly, it is difficult to track an object using the pan, tilt, and zoom functions of the camera, causing many users to be dissatisfied with the performance of the camera.

For example, FIG. 1 is a block diagram of a PTZ camera system 100 known in the art. As seen in FIG. 1, input 105 that includes a p/t/z request can be received via a user input device 110, such as a head-end keyboard, joystick, or the like, of an IP PTZ camera 160 at a network packet port 115 and transmitted to a request module 120. The request module 120 can include a webpage request sub-module 121, an http video stream request sub-module 122, and a control protocol request sub-module 123.

The request module 120 can transmit the input 105, including the p/t/z/ request, to an http parser 125. For example, the parser 125 in some known systems includes a parser that employs the Open Network Video Interface Forum (ONVIF) protocol.

The parser 125 can transmit the input 105 to a processor module 130, and, as seen in FIG. 1, the processor module 130 can include a webpage processor 131, a video streaming processor 132, and a control protocol processor 133. The control protocol processor 133 can process the received input 105, including the p/t/z request, and transmit the processed input 105 to a syntax analyzer 135.

The syntax analyzer 135 can extract a p/t/z command 140, that is, a pan, tilt, and zoom command, from the processed input 105 and transmit the p/t/z command 140 to a motor driver unit 145, which can then transmit the command 140 to a motor 150 of the PTZ camera 160 for producing a response 155 from the PTZ camera 160. Accordingly, as seen in FIG. 1, in known systems, the p/t/z command 140 is not extracted from the input 105 until after the input 105 passes through the http processor 125 and the processor module 130. This contributes to a delayed and latent response 155 from the PTZ motor 150 and camera 160 after the input 105 is received.

In view of the above, there is a continuing, ongoing need for an improved apparatus and method to reduce PTZ latency.

DETAILED DESCRIPTION

Figure 1:
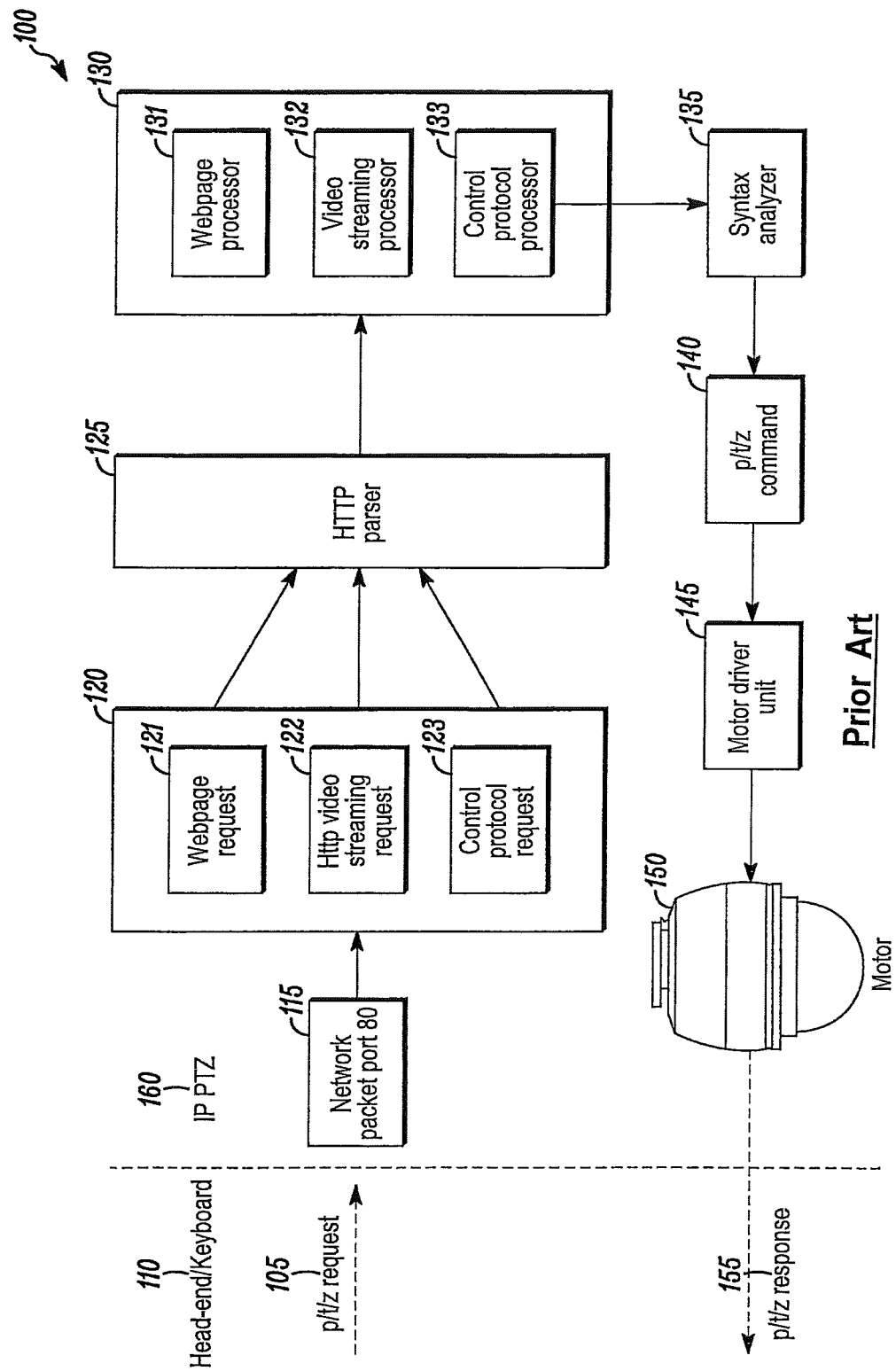
FIG. 1 is a block diagram of a PTZ camera system known in the art.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein include an improved apparatus and method to reduce PTZ latency. For example, in some embodiments, the latency between receiving input with a p/t/z/ request and the resulting response from a PTZ camera and motor can be reduced. Accordingly, a user's experience when operating the PTZ system can be improved.

The improved apparatus and method to reduce PTZ latency in accordance with embodiments disclosed herein can be implemented in firmware and/or hardware. Additionally or alternatively, in some embodiments, the improved apparatus and method disclosed herein can be implemented with executable control software stored on a transitory or non-transitory computer readable medium, including but not limited to, computer memory, RAM, optical storage media, magnetic storage media, flash memory, and the like.

Figure 2:
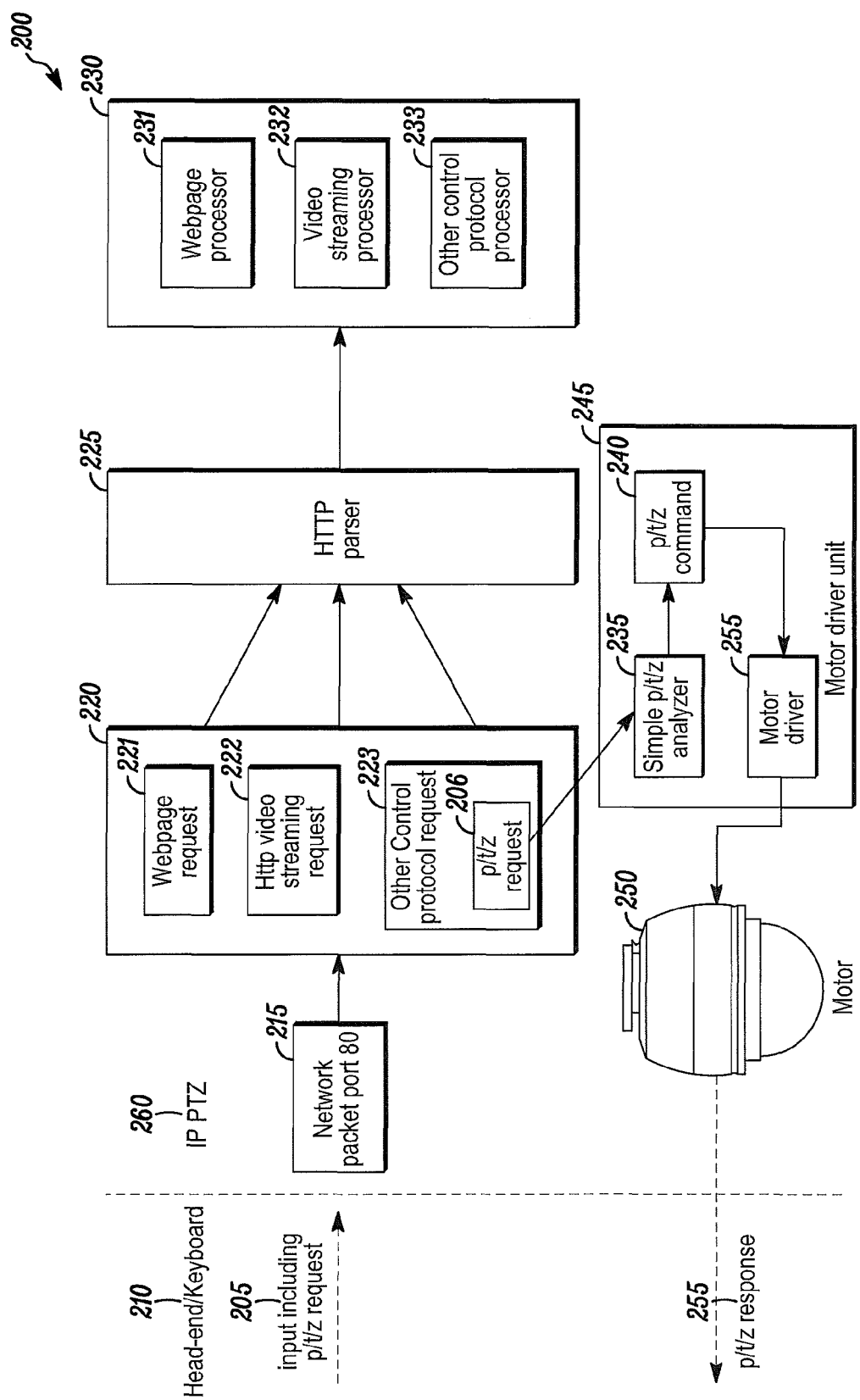
FIG. 2 is a block diagram of a PTZ camera system in accordance with disclosed embodiments.

FIG. 2 is a block diagram of a PTZ camera system 200 in accordance with disclosed embodiments. As seen in FIG. 2, input 205 that includes a p/t/z request can be received via a user input device 210, such as a head-end keyboard, joystick, or the like, of an IP PTZ camera 260 at a network packet port 215 and transmitted to a request module 220. In some embodiments, the request module 220 can include a webpage request sub-module 221, an http video stream request sub-module 222, and a control protocol request sub-module 223.

Unlike known systems, the control protocol request sub-module 223 can extract the p/t/z request 206 from the input 205 and transmit at least the p/t/z/ request 206 to a motor driver unit 245 without first passing the p/t/z/ request 206 through an http and/or ONVIF parser 225 or a processor module 230, including a webpage processor 231, a video streaming processor 232, or a control protocol processor 233.

In some embodiments, the control protocol request sub-module 223 can include a simple text parser to accelerate parsing. For example, the text parser in the sub-module 223 can extract and process only PTZ parameters, including the p/t/z request 206 in the input 205.

As seen in FIG. 2, the motor driver unit 245 can include a p/t/z/ analyzer 235 and a motor driver 255. In some embodiments, the motor driver unit 245, including the analyzer 235 and the motor driver 255 can be enclosed in a housing.

The p/t/z analyzer 235 of the motor driver unit 245 can receive the p/t/z/ request 206 from the control protocol request sub-module 223, extract a p/t/z/ command 240, that is, a pan, tilt, and zoom command, from the request 206, and transmit the p/t/z command 240 to the motor driver 255. Then, the motor driver 255 can transmit the command 240 to a motor 250 of the PTZ camera 260 for producing a response 255 from the PTZ camera 260. Because the p/t/z/ request 206 is processed early, that is, without first passing through a parser 225 and a processor 230, and is instead processed directly in the motor driver unit 245, the latency between receiving the request 206 in the input 205 and the resulting response 255 from the PTZ camera 260 and motor 250 can be reduced. Thus, the system 200 can be more efficient and respond to user input more quickly.

When known PTZ camera systems are compared with the systems and methods disclosed herein, substantial reduction in the latency between receiving a p/t/z request and the resulting response from the PTZ camera and motor under test can be observed. For example, known PTZ cameras systems, including the system 100 shown in FIG. 1, can include a latency of approximately 175-261 ms. When the performance of the processor and/or the syntax analyzer of known systems is improved, the resulting latency can be decreased to approximately 160 ms. However, when systems and methods disclosed herein are employed, including the system 200 shown in FIG. 2, the latency can be reduced to approximately 22 ms.

Although a few embodiments have been described in detail above, other modifications are possible. For example, the logic flows described above do not require the particular order described, or sequential order, to achieve desirable results. Other steps may be provided, or steps may be eliminated, from the described flows, and other components may be added to, or removed from, the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the sprit and scope of the invention.

What is claimed is:

1. A system comprising:
    an IP PTZ camera further comprising:
        an input port;
        a request module coupled directly to the input port, the request module including a webpage request sub-module, an http video stream request sub-module and a control protocol request sub-module;
        an http or ONVIF parser; and
        a motor driver unit,
        wherein the input port receives a PTZ request,
        wherein the input port transmits the PTZ request to the request module, and
        wherein the control protocol request sub-module of the request module extracts a PTZ command from the PTZ request received from the input port using a simple text parser and transmits the PTZ command directly to the motor driver unit without first passing the PTZ command through the http or ONVIF parser.

2. The system of claim 1 further comprising a processor, wherein the PTZ request obviates transmission through the http or ONVIF parser and the processer.

3. The system of claim 1 wherein the input port receives input that includes the PTZ request.

4. The system of claim 3 wherein the control protocol request sub-module extracts the PTZ request from the input.

5. The system of claim 1 wherein the motor driver unit includes an analyzer and a motor driver.

6. The system of claim 5 wherein the analyzer extracts the PTZ command from the PTZ request and transmits the PTZ command to the motor driver.

7. The system of claim 5 wherein the motor driver transmits the PTZ command to a motor of a PTZ camera.

8. The system of claim 7 wherein the motor of the PTZ camera executes the PTZ command.

9. An apparatus comprising:
    an IP PTZ camera further comprising:
        an analyzer including a webpage request sub-module, an http video stream request sub-module and a control protocol request sub-module;
        an http or ONVIF parser; and
        a motor driver,
        wherein the control protocol request sub-module of the analyzer extracts a PTZ command from a PTZ request received through an input port of the IP PTZ camera using a simple text parser and transmits the PTZ command to the motor driver, and
        wherein the control protocol request sub-module transmits the PTZ command directly to the motor driver of the IP PTZ camera for execution of the PTZ command without first passing the PTZ command through the http or ONVIF parser.

10. The apparatus of claim 9 further comprising a housing enclosing the analyzer and the motor driver.

11. The apparatus of claim 9 wherein the analyzer receives the PTZ request from an input port or from a request module of a PTZ camera.

12. The apparatus of claim 9 wherein the PTZ request obviates transmission through the http or ONVIF parser and a processor before the analyzer receives the PTZ request.

13. A method comprising:
    an IP PTZ camera receiving a PTZ request through an input port;
    transmitting the received PTZ request to a request module coupled directly to the input port, wherein the request module includes a webpage request sub-module, an http video stream request sub-module and a control protocol request sub-module;
    the control protocol request sub-module of the request module extracting a PTZ command from the PTZ request using a simple text parser; and
    the control protocol request sub-module obviating transmission of the PTZ request through an http or ONVIF parser and a processor by transmitting the PTZ command directly to a motor drive unit of the IP PTZ camera.

14. The method of claim 13 wherein receiving the PTZ request includes receiving an input that includes the PTZ request.

15. The method of claim 14 further comprising the control protocol request sub-module extracting the PTZ request from the input.

16. The method of claim 13 wherein receiving the PTZ request includes at least one of the input port, the request module, the motor drive unit, and an analyzer receiving the PTZ request.

17. The method of claim 13 further comprising an analyzer extracting the PTZ command from the PTZ request.

18. The method of claim 13 further comprising transmitting the PTZ command to a motor driver.

19. The method of claim 18 further comprising executing the PTZ command.

20. The system of claim 1, wherein the control protocol request sub-module and the motor driver unit are implemented in firmware.

* * * * *